Patented Dec. 23, 1930

1,785,951

UNITED STATES PATENT OFFICE

WILFRID GIBSON, CHARLES ROYSTON HENSHAW, AND JOSEPH BARON PAYMAN, OF BLACKLEY, MANCHESTER, ENGLAND, ASSIGNORS TO IMPERIAL CHEMICAL INDUSTRIES LIMITED, OF LONDON, ENGLAND

MANUFACTURE OF TRIARYL PHOSPHATES

No Drawing. Application filed September 7, 1929, Serial No. 391,108, and in Great Britain September 27, 1928.

The triaryl phosphates are valuable plasticisers in the cellulose ester industry, and can be prepared by the action of phosphorous oxychloride on the appropriate phenol. This reaction proceeds in the desired direction to a certain extent by merely heating together the reactants to a temperature of about 250° C.

We have now found that improved yields of these esters can be obtained at lower temperatures if the reaction is carried out in the presence of small amounts of certain organic bases such as aniline, dimethylaniline, toluidine, pyridine, and the like, which act catalytically.

Our invention is illustrated but not limited by the following example in which the parts are by weight.

Example 324 parts of cresylic acid, 153 parts of phosphorous oxychloride, and 2 parts of dimethylaniline are mixed in an acid-resisting vessel surmounted by an efficient water-cooled reflux condenser, leading to an arrangement for the absorption of hydrochloric acid. The temperature is slowly raised to 200° C. and is maintained there until the evolution of hydrochloric acid ceases. At this point the loss in weight from the reaction vessel, and the increase in weight of the absorption train are approximately 109 parts. The crude tricresyl phosphate in the reaction vessel is worked up by the usual methods.

What we claim and desire to secure by Letters Patent is:—

1. The process of manufacturing triaryl phosphates which comprises reacting on a phenolic body with phosphorus oxychloride in presence of dimethylaniline.

2. The process of manufacturing triaryl phosphates which comprises reacting on cresylic acid with phosphorus oxychloride in the preesnce of dimethylaniline.

In testimony whereof we affix our signatures.

WILFRID GIBSON.
CHARLES ROYSTON HENSHAW.
JOSEPH BARON PAYMAN.